United States Patent
Mattes et al.

(10) Patent No.: US 11,005,999 B2
(45) Date of Patent: May 11, 2021

(54) COMPUTER-IMPLEMENTED METHOD FOR ESTABLISHING A VOIP COMMUNICATION

(71) Applicant: Unify Patente GmbH & Co. KG, Munich (DE)

(72) Inventors: Symeon Mattes, Athens (GR); Lampros Pappas, Athens (GR); Vasileios Giatilis, Palaio Faliro (GR)

(73) Assignee: Unify Patente GmbH & Co. KG, Munich (DE)

( * ) Notice: Subject to any disclaimer, the term of this patent is extended or adjusted under 35 U.S.C. 154(b) by 267 days.

(21) Appl. No.: 15/854,983

(22) Filed: Dec. 27, 2017

(65) Prior Publication Data
US 2018/0191909 A1 Jul. 5, 2018

(30) Foreign Application Priority Data
Dec. 30, 2016 (EP) ..................................... 16207647

(51) Int. Cl.
*H04M 7/00* (2006.01)
*H04L 29/06* (2006.01)
(Continued)

(52) U.S. Cl.
CPC ........ *H04M 7/006* (2013.01); *H04L 65/1053* (2013.01); *H04L 65/1069* (2013.01);
(Continued)

(58) Field of Classification Search
CPC .... H04M 7/006; H04M 3/02; H04M 3/42246; H04M 3/42314; H04L 65/1053; H04L 65/1069; H04L 67/02
See application file for complete search history.

(56) References Cited

U.S. PATENT DOCUMENTS 5,894,512 A * 4/1999 Zenner ................... H04M 3/51
348/14.01
9,473,452 B1 * 10/2016 Judge .................. H04L 61/2564
(Continued)

FOREIGN PATENT DOCUMENTS

WO 2015006654 A1 1/2015

OTHER PUBLICATIONS

European Search Report for European Patent Application Serial No. 16207647.5 dated Jun. 23, 2017.

*Primary Examiner* — Jeffrey M Rutkowski
*Assistant Examiner* — Jasper Kwoh
(74) *Attorney, Agent, or Firm* — Buchanan Ingersoll & Rooney PC

(57) ABSTRACT

A computer-implemented method for establishing a VOIP communication between a PBX system and a first terminal device is disclosed. The first terminal device has a VOIP application or video call application. The PBX system and the first terminal device are able to communicate via a first communication connection and a second communication connection. When the PBX system receives a call to be forwarded to the first terminal device the PBX system verifies whether the first terminal device is logged in. If the PBX system verifies that the first terminal device is not logged in, the call is rejected. If the PBX system verifies that the first terminal device is logged in, the PBX system determines whether the application on the first terminal
(Continued)

device is running in a background mode or in a foreground mode. When the PBX system determines that the application is running in the foreground mode, the PBX system uses the first connection for forwarding the call. When the PBX system determines that the application is running in the background mode the PBX system uses the second connection to receive information about the communication connection being used.

20 Claims, 4 Drawing Sheets

(51) Int. Cl.
  *H04M 3/42* (2006.01)
  *H04L 29/08* (2006.01)
  *H04M 3/02* (2006.01)
(52) U.S. Cl.
  CPC .............. *H04L 67/02* (2013.01); *H04M 3/02* (2013.01); *H04M 3/42246* (2013.01); *H04M 3/42314* (2013.01)

(56) References Cited

U.S. PATENT DOCUMENTS

| 2007/0206585 | A1* | 9/2007 | Lee ................... H04M 3/42323 370/356 |
| 2009/0029708 | A1* | 1/2009 | Iwata ................... H04W 40/12 455/436 |
| 2013/0130669 | A1* | 5/2013 | Xiao ................. H04M 1/72566 455/418 |
| 2015/0035987 | A1* | 2/2015 | Fernandez ............. H04N 7/186 348/156 |
| 2015/0049157 | A1* | 2/2015 | Krishnamoorthy ..... H04W 4/21 348/14.1 |
| 2015/0131648 | A1  | 5/2015 | Shuman et al. |
| 2015/0245409 | A1* | 8/2015 | Medapalli ............. H04W 76/20 370/329 |
| 2015/0282117 | A1* | 10/2015 | Serna Pozuelo .... H04W 68/005 455/458 |
| 2017/0134452 | A1* | 5/2017 | Belimpasakis ......... H04L 67/26 |
| 2017/0201627 | A1* | 7/2017 | Fukuda ............... H04L 65/1053 |

* cited by examiner

COMPUTER-IMPLEMENTED METHOD FOR ESTABLISHING A VOIP COMMUNICATION

FIELD OF INVENTION

The present invention is relates to a computer-implemented method for establishing a VOIP communication between a PBX system and a first terminal device in a communication network, a Private Branch Exchange (PBX) system, and a communication network.

BACKGROUND OF THE INVENTION

Telephony, like voice or video communications, nowadays may be performed via the Internet which, in particular, for long-distance calls may be very cost-saving and economical compared to regular landline networks, like for example, Integrated Services Digital Network (ISDN), since so-called the Voice over Internet Protocol (VOIP) allows voice communications, video communication, or multimedia sessions of Internet Protocol (IP) networks, such as the Internet. With increasing use of Internet telephony, PBX development is directed more and more to using the Internet Protocol for carrying out calls.

Therefore, in prior art, PBX systems which are adapted for connecting to terminal devices, like mobile devices, through Local Area Network (LAN) or Wide Area Network (WAN) (through Network Address Translation (NAT)) or Global System for Mobile Communications (GSM) networks, are known. For being able to carry out VOIP communication, a corresponding VOIP or video call application or the like has to be installed on the mobile device. Also other terminal devices, like non-mobile devices, may be connected to such PBX systems.

The procedure for carrying out VOIP communication with such known systems is as follows. Usually, a terminal device like for example a non-mobile device, is able to directly communicate with the VOIP application of, for example, another terminal device like a mobile device through the PBX system. In such a case, the mobile device may answer the call or may reject it.

However, there cases may occur when the VOIP application is paused after a while meaning that the application is moving from a foreground mode to a background mode. A reason for such a shift from foreground to background mode may be that another application is used, or the device has been locked, or even just because the VOIP application has not been used for a long time. The shift can ensure long battery life and reduce memory and CPU usage. In those cases mentioned above, it is necessary to perform this shift from foreground to background mode. Specifically, with respect to mobile devices sold by Apple, Inc. having the iOS brand operating software provided by Apple, Inc., this is indispensable. But it is also considered to be rather important for other mobile operating systems supporting remote notification services.

Since the VOIP application on a terminal device to be connected to an incoming call may be in background mode, for either one of the reasons outlined above, the PBX system needs to be able to send any notifications to the terminal device through a remote notification server. Apple branded Push Notification Service (APNS) of Apple Inc., and the Firebase branded Cloud Messaging of Google LLC (GCM) and other proprietary services which are using a unique identification (ID) number in order to send it successfully to the correct device are examples of these types of services.

Thus, usually, if the non-mobile terminal device mentioned above makes a call to the VOIP application of the mobile device mentioned above which at that point of time is in background mode, a remote notification is sent to the mobile device through the remote notification server. When the user receives the notification, then the user can move the VOIP application into the foreground mode again, so as to then be able to answer or reject the call.

Apart from routing VOIP calls, a PBX system may also deflect a VOIP call to another network, like GSM or to another device, if required. For example, this may be necessary in such cases, where the VOIP application is not registered with the PBX system, or the VOIP application is not allowed to register with the PBX system, because it tries to connect from a WAN/GSM network which is not considered to be secure or trustworthy by the PBX system or the mobile device. Another case may be that the PBX system does not allow VOIP calls from applications that do not support specific codecs, such as G.722.

However, when a user's mobile device changes network and moves, for example, from a WAN to a GSM network while the VOIP application is in the background mode, then a problem occurs for the PBX system which at that time is not connected to the VOIP application and thus, when receiving an incoming call to be forwarded to the mobile device, does not "know" whether or not it can reach the mobile device, if it should send a remote notification with a call message, or if it should act differently, like, e.g., deflecting the call to Voice Mail or to a GSM call.

Therefore, there is no need for a computer-implemented method for establishing a VOIP communication between a PBX system and a first terminal device in a communication network, a Private Branch Exchange (PBX) system, and a communication network which in which roaming mobile terminal devices may be better integrated.

SUMMARY OF THE INVENTION

This problem is solved by a computer-implemented method for establishing a VOIP communication between a PBX system and a first terminal device in a communication network having the features according to claim 1, a Private Branch Exchange (PBX) system having the features according to claim 12, and a communication network having the features according to claim 14. Preferred embodiments of the invention are defined in the respective dependent claims.

Accordingly, a computer-implemented method for establishing a VOIP communication between a PBX system and a first terminal device in a communication network is provided, wherein the first terminal device is provided with a VOIP application or video call application, and wherein the PBX system and the first terminal device are able to communicate via a first and a second communication connection in the communication network, the method comprising the steps of receiving, by the PBX system, a call from a second terminal device to be forwarded to the first terminal device;

verifying, by the PBX system, if the first terminal device is logged in the communication network, wherein if the PBX system verifies that the first terminal device is not logged in, the call is rejected, and if the PBX system verifies that the first terminal device is logged in, then the further steps are performed by the PBX system:

determining, whether the VOIP application or video call application on the first terminal device is running in a background mode with the VOIP application or video call application being inactive, or in a foreground mode with the VOIP application or video call application being active, and if the PBX system determines that the VOIP application or video call application is running in the foreground mode, using the first connection between the PBX system and the first terminal device for forwarding the call to the first terminal device, and if the PBX system determines that the VOIP application or video call application is running in the background mode, using the second connection between the PBX system and the first terminal device for receiving information from the first terminal device on the type of its communication connection that it is using at that point of time.

According to the inventive method, it is possible for the PBX system to identify the mode of the VOIP application on the first terminal device to which a call is to be forwarded, and therefore, the PBX system is able to act accordingly, like for example, deflect the call to another network or deflect it to Voice Mail or the like. Further, according to the present invention, this call forwarding or routing is even possible for the PBX system, if the VOIP application on the terminal device for which the call is intended, is not active, i.e., is in the background mode.

Preferably, if the PBX system cannot determine that the VOIP application or video call application is running in the foreground mode, the PBX system transmits to a remote notification server being provided in the communication network a first message in order to cause the remote notification server to send a remote notification message to the first terminal device.

According to a preferred embodiment, the second connection between the PBX system and the first terminal device is activated, when the PBX system, after the first terminal device, in particular, the VOIP application or video call application on the first terminal device, has received the remote notification message from the remote notification server, and receives a message from the first terminal device via the second connection comprising information that the VOIP application or video call application is moved into foreground mode.

According to another preferred embodiment, the second connection between the PBX system and the first terminal device is activated, when the PBX system, after the first terminal device, in particular, the VOIP application or video call application on the first terminal device, has received the remote notification message from the remote notification server, and receives a message from the first terminal device via the second connection comprising information on the type of communication connection it is using at that point of time.

The type of communication connection may comprise Local Area Network (LAN), Wide Area Network (WAN), and/or Global System for Mobile Communications (GSM). Also other known communication networks are possible.

Preferably, the first connection between the PBX system and the first terminal device is activated, when the VOIP application or video call application is in the foreground mode, and is terminated by VOIP application, when the VOIP application or video call application moves to the background mode.

Further, advantageously, the first connection which is related to cases in which the VOIP application is in foreground mode and is terminated either by force, e.g., by the operating system (OS) of the first terminal device, or by the VOIP application itself when moving from foreground to background mode, may be based on any architectural paradigm such as Hypertext Transfer Protocol (HTTP), Socket, or Web Socket Protocol.

Also, the second connection which is activated only when a message is received by the first terminal device from the remote notification server, may be of any type, such as Socket which consume the least resource or which is recommended or which is considered to be indispensable, for example, in cases in which the OS of the mobile device requires it.

Preferably, the PBX system deflects, upon receiving information on the type of communication connection, the first terminal device is using at that point of time, the call to that communication connection.

However, according to another preferred embodiment, the PBX system, upon receiving information on the type of communication connection, the first terminal device is using at that point of time, may also deflect the call to Voice Mail or to a third terminal device, which is also equipped with a VOIP application or video call application.

According to still another preferred embodiment, a time window is started expiring either upon receipt of information on the type of connection by the PBX system or upon reaching a predetermined upper time limit, after the remote notification server has sent a remote notification message to the first terminal device.

Further, the inventive method described above is based on push notification technologies. However, similar architectural paradigms may also apply pull notifications in the method described above. It is noted that pull notification technology is slower with respect to performance than push notification technology so that push notifications are preferred.

Moreover, according to the present invention, a Private Branch Exchange (PBX) system for carrying out the method specified above is provided, the system being adapted to connect, in a communication network, to at least one first terminal device being equipped with a VOIP application or video call application for forwarding a VOIP call or video call from a second terminal device to which the system is being adapted to connect to, and to a remote notification server, wherein the PBX system comprises a core unit which is adapted for communicating with the VOIP application of the first terminal device, and a provider unit, which is adapted to send a remote notification to the VOIP application of the first terminal device via a remote notification server, wherein the core unit is adapted to communicate with the first terminal device via a first connection, if the VOIP application on the first terminal device is running in a foreground mode, and via a second connection for receiving information on the type of communication connection the first terminal device is currently using from the first terminal device.

The PBX system according to the present invention provides the advantages already discussed above in connection with the inventive computer-implemented method for establishing a VOIP communication between a PBX system and a first terminal device in a communication network.

According to a preferred embodiment, the first connection is based on Hypertext Transfer Protocol (HTTP), Socket, or WebSocket, and the second connection is also based on Hypertext Transfer Protocol (HTTP), Socket or Web Socket Protocol.

According to the invention, further, a communication network is provided comprising a PBX system as specified above, a first terminal device equipped with a VOIP application or a video call application, and a remote notification server.

Further aspects, embodiments, objects and advantages of the present invention will become apparent by the following description of exemplary embodiments with reference to the accompanying drawings.

DESCRIPTION OF THE PREFERRED EMBODIMENTS

Figure 1:
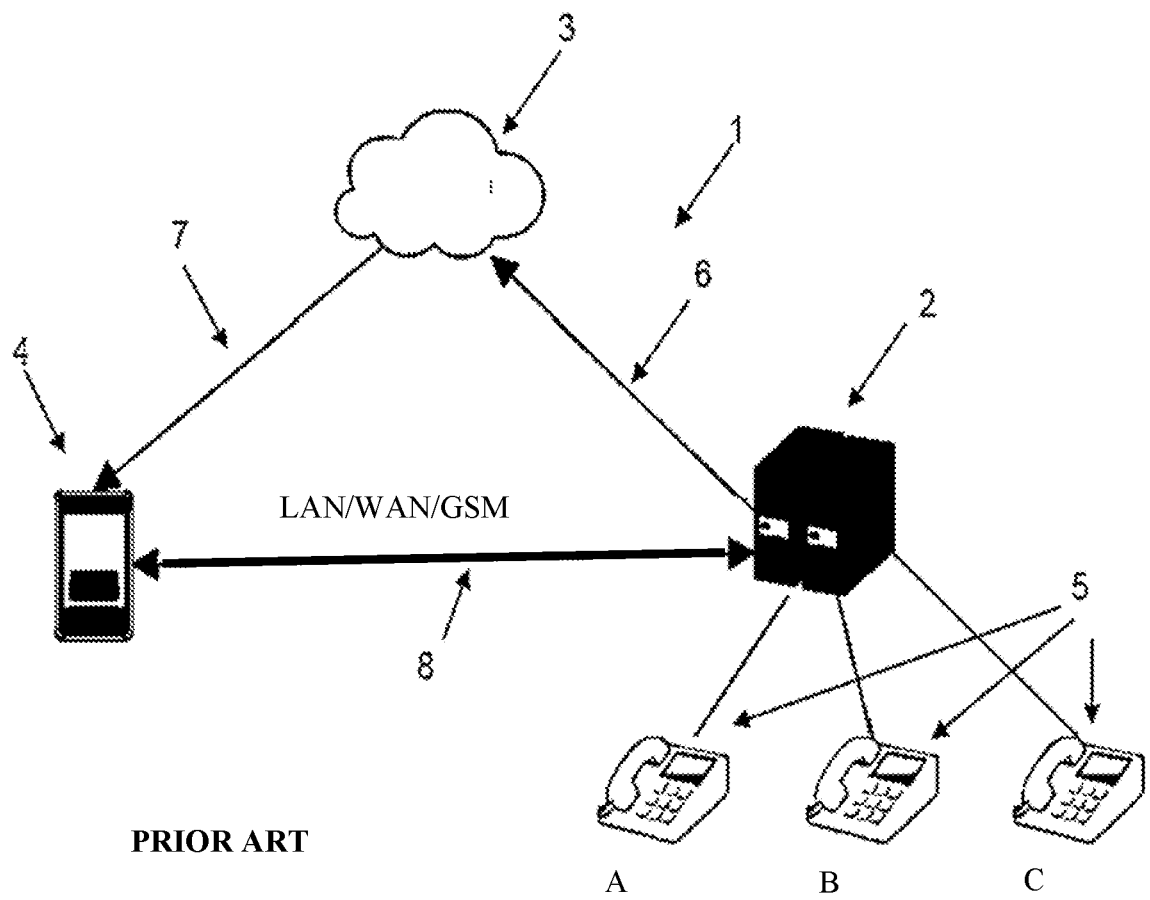
FIG. 1 shows a schematic illustration of a communication network according to prior art.

FIG. 1 shows a schematic illustration of a communication network 1 according to prior art. In the communication network 1 in which a PBX system 2, a remote notification server 3, and a first terminal device 4 are connected. The first terminal device 4 is a mobile phone equipped with a VOIP application, and being able to connect to the PBX system through LAN, WAN, or GSM via the communication connection 8. Also other devices can connect to the PBX system 2. In the example shown here, a number of second terminal devices 5 which are embodied as regular telephones A, B, C is able to connect to the PBX system 2. In this configuration, if one of the second terminal devices 5, like the telephone A, makes a direct call to the VOIP application running on the first terminal device 4, via the PBX system 2, then the first terminal device 4 may either answer the call or reject it.

Further, if the VOIP application installed on the first terminal device 4 for some reason is paused after a while, i.e., the application is moved from a foreground mode to a background mode, then the PBX system 2 needs to send any notifications to the first terminal device 4 via the remote notification server 3. Examples for such services comprise, but are not limited to, APNS GCM, and other proprietary services, which are using a unique ID number in order to send the notification to the correct, i.e., the intended terminal device.

Usually, if the telephone A from the second terminal devices 5 makes a call to the VOIP application on the first terminal device 4 which at that point of time is in the background mode, i.e., it is inactive, then a remote notification is sent from the first terminal device from the PBX system 2 via communication connection 6 to the remote notification server 3, and from the remote notification server 3 via communication connection 7 to the first terminal device 4. When the user of the first terminal device 4 receives the notification, then he or she can bring the VOIP application from background mode to foreground mode again, whereupon he or she is able to either answer the incoming call or to reject it.

However, a problem may occur in this configuration, if in the meantime, the first terminal device 4 has switched to another communication network, for example, from WAN to GSM when the VOIP application was still in background mode. Since the VOIP application does not have any connection to the PBX system 2 in this case, consequently, the PBX system 2 does not know if it should send a remote notification with a call message, or if it should act differently, like deflecting the call to Voice Mail or to GSM.

Figure 2:
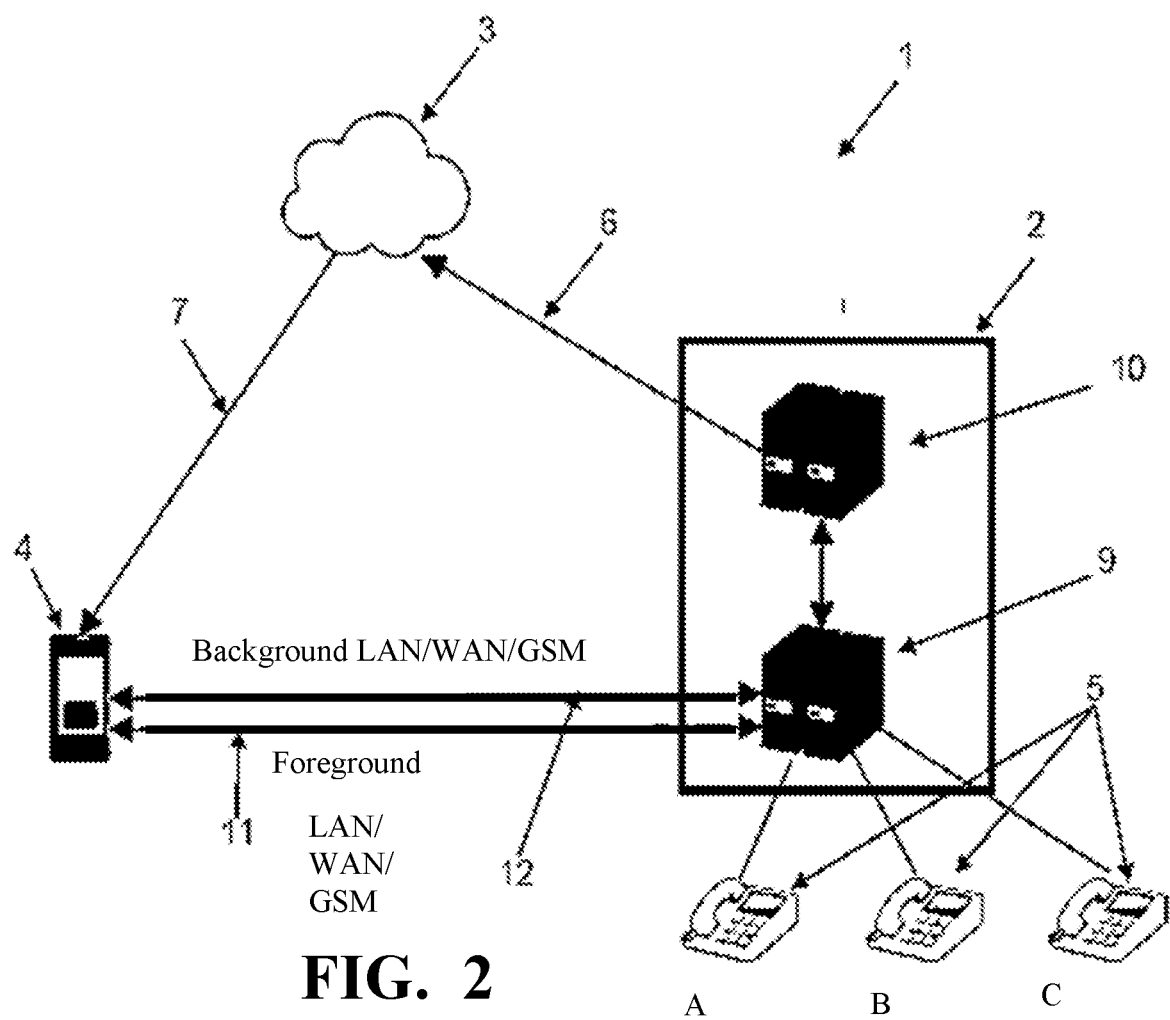
FIG. 2 shows a schematic illustration of a communication network according to an embodiment of the present invention.

FIG. 2 shows a schematic illustration of a communication network 1 according to an embodiment of the present invention. First of all, it should be noted that although the present invention in this example is described with respect to a VOIP application and VOIP calls, it could just as well be implemented with other applications, as for example, video calls or the like.

In the embodiment shown in FIG. 2, in contrast to the configuration shown in FIG. 1, the PBX system 2 is divided into two systems or units and comprises a core unit 9 which is adapted for communicating with the VOIP application of the first terminal device 4, and a provider unit 10, which is adapted to send a remote notification to a the VOIP application of the first terminal device 4 via a remote notification server 3 using the communication connections 6 and 7. It is noted that the provider unit 10 may either be implemented as an independent entity or as a service within the PBX system 2 itself. For the connection between the VOIP application on the first terminal device 4, two communication connections are necessary: A first connection 11 which is used in cases, when the VOIP application on the first terminal device 4 is running in the foreground mode. This type of connection may be based on any architectural paradigm, such as HTTP connections, Socket, WebSocket, etc. A second connection 12 is only activated when a message is sent from the PBX system 2 via the remote notification server 3 to the VOIP application on the first terminal device 4, when the latter is running in the background mode. This type of connection could also be of any type, such as sockets or the like.

Thus, according to the configuration described above, the foreground connection, namely, the first connection 11 is responsible for receiving any calls directly from the PBX system 2, while the background connection, namely, the second connection 12 is responsible for informing the system about the state of the first terminal device 4, i.e., whether it currently is in a LAN, WAN, or GSM-network.

Figure 3:
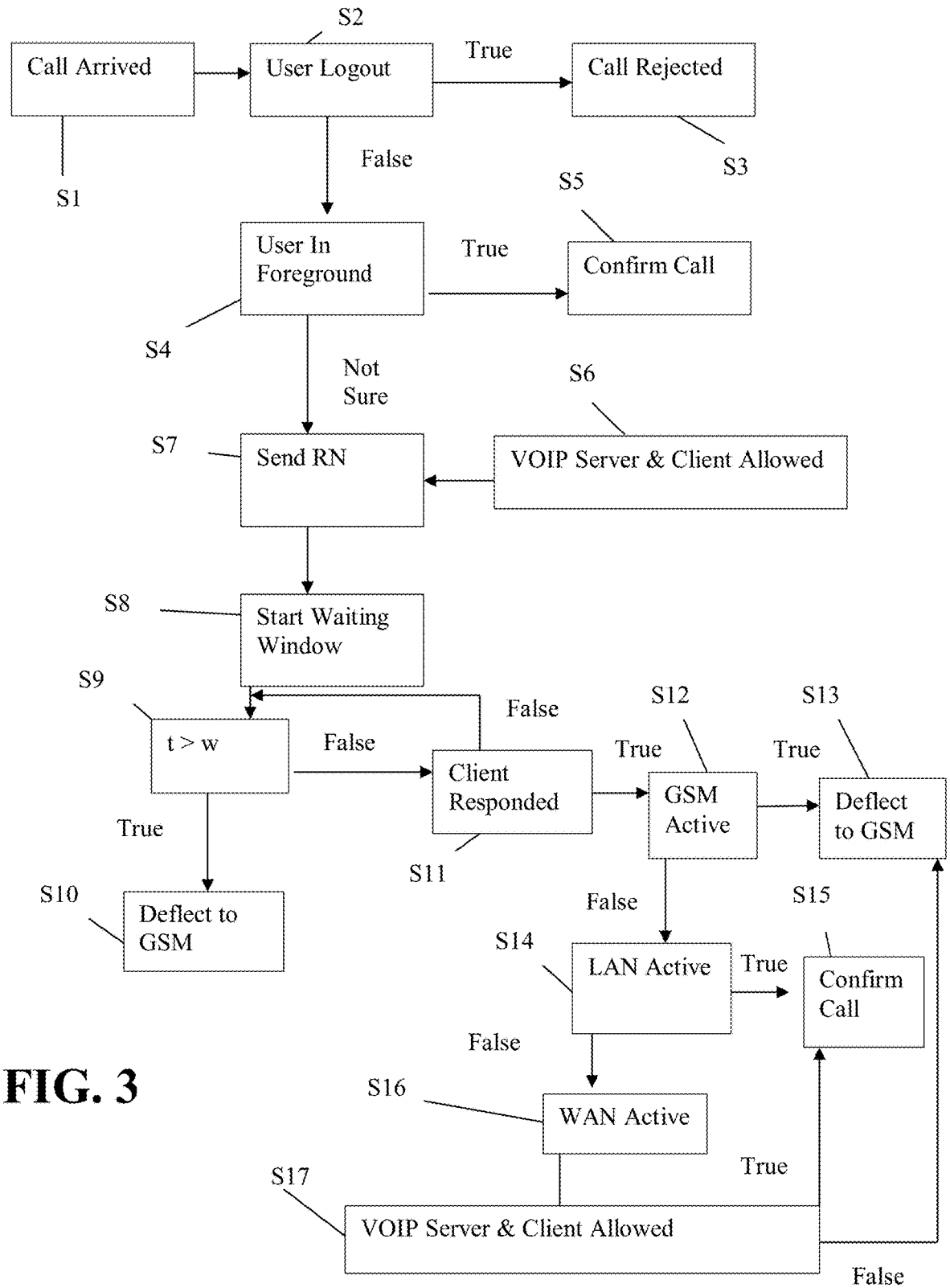
FIG. 3 shows a flowchart diagram of a VOIP application during a call in background mode.

FIG. 3 shows a flowchart diagram of a VOIP application during a call in background mode. First of all, it is noted that the PBX system 2 (see FIG. 2) is able to determine with certainty whether a VOIP client, for example, the first mobile device 4 shown in FIG. 2, is logged in the PBX system 2. Also, it is able to verify, whether the VOIP application currently is running in foreground mode. However, it may not determine with certainty whether the VOIP application currently is in background mode and which connection, as either LAN/WAN/GSM, the first terminal device 4 is currently using.

A possible scenario for such a situation may be as follows. The VOIP application of the first terminal device 4 (FIG. 2) is in foreground mode and in a LAN network. Then, at some point of time, the first terminal device 4 loses the connection to the LAN network and the PBX system 2 is not informed and thus is waiting for the first terminal device 4 to respond through a keep alive mechanism. Then, VOIP application installed on the first terminal device 4 moves to the background mode and, as a consequence, is paused. Also, the first terminal device 4 switches from the LAN network to the GSM network.

The procedure during a call for the scenario depicted above, i.e., the steps the PBX system 2 takes in such a case, are shown in the flowchart of FIG. 3. Namely, the PBX system 2 may take the following actions "Call Rejected", "Confirm Call", or "Deflect to GSM" according to the information it has. These actions, however, could also be different depending on the configuration of the system. For instance, "Deflect to GSM" could instead be a deflection to Voice Mail or to another VOIP device.

When an incoming call arrives at the PBX system 2 (S1), for example, for a second terminal device 5 (see FIG. 2), then the PBX system 2 first checks, whether the first terminal device 4 (see FIG. 2) is logged in (S2). If it is not logged in, then the call is rejected immediately (S3).

If it is determined by the PBX system 2 that the VOIP application on the first terminal device 4 is running in foreground mode (S4), then the call is confirmed (S5).

However, since there is some uncertainty whether the VOIP application currently, namely, at the point of time, the PBX system 2 receives the incoming call from the second terminal device 5, is in the background mode, or if it has lost its signal. Therefore, if the VOIP server and the corresponding client, here, the first terminal device 4, are determined allowed (S6), a remote notification is sent by the PBX system 2 (S7) to the first terminal device 4 via the remote notification server 3. This message includes two flags which indicate whether the specific client, here, the first terminal device 4, is allowed to register over WAN remotely to the PBX system 2. One of the two flags relates to the PBX system 2 and the other one to the client, namely, the first terminal device 4.

Since the PBX system 2 does not have any information on the type of connection of the first terminal device 4 at that point of time, the PBX system 2 needs to verify it. The main characteristic of the verification process is a time window which starts after sending the remote notification to the first terminal device 4 (S8), which expires either upon the first terminal device 4 providing the PBX system 2 with the requested information on the type of connection by using the second connection 12 between the first terminal device 4 and the PBX system 2, or because a predetermined upper time limit has been exceeded (S9). In the latter case, the call is deflected to GSM immediately (S10). Otherwise, if the first terminal device 4 has shifted from LAN WiFi to WAN WiFi and the two flags are non-active, and the first terminal device 4 has responded to the PBX system 2 (S11), it is further checked, if the GSM is active (S12), and if it is active, then the call is deflected by the PBX system 2 to GSM (S13). Otherwise, if instead it is determined that GSM is not active, it is checked, whether LAN is active (S14). If this is true, then the call is confirmed (S15). If not, then it is further checked whether WAN is active (S16) and if it is active and if the VOIP server and client (first terminal device 4) are allowed (S17), then the call is confirmed. Otherwise, the procedure returns to deflecting the call to GMS (S13).

Figure 4:
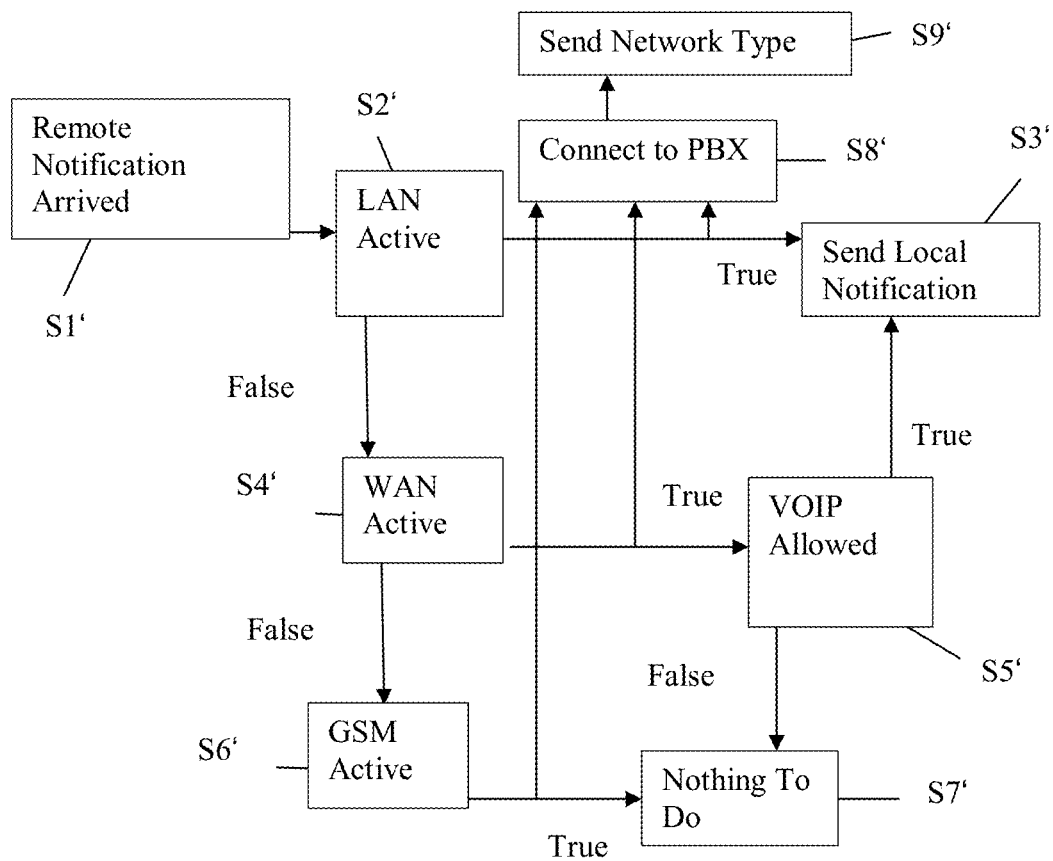
FIG. 4 shows another flowchart diagram of the VOIP application during a call in background mode.

FIG. 4 shows another flowchart diagram of the VOIP application during a call in background mode. In this case here, the client, as for example, the first terminal device 4 shown in FIG. 2, has an Internet connection. Then, a remote notification is sent by the PBX system 2 via the remote notification server 3 to the first mobile device 4 or client. Now, basically the following two actions have to be performed. Firstly, the type of connection has to be verified and a corresponding local notification has to be sent to the first terminal device 4 or the message has to be ignored. Secondly, the first terminal device 4 has to connect to the PBX system 2 and provide it with information on the type of connection it is currently using.

Here, in the flowchart, the responding procedure of the VOIP application during a call in background mode is illustrated, as mentioned above. As mentioned previously, "Send Local Notification" or "Confirm Call" or "Deflect to GSM" are actions that the PBX system 2 may take according to information it has. These actions may be different depending on the configuration of the application. "Send Local Notification" could imply that a notification is sent with the name of the caller, while "Nothing To Do" could be replaced with an action that might be considered important for the PBX system 2 or the client. As shown here, namely, if a remote notification has arrived (S1'), it is checked whether LAN is active (S2'). If it is active, then either a local notification is sent (S3'), or a connection to the PBX system 2 is established (S8') so as to send the type of network which is currently used (S9'). If LAN is not active, then it is checked whether WAN is active (S4'). If it is active, it is checked whether VOIP is allowed (S5'), and the procedure returns to sending a local notification (S3'), or to establishing a connection to the PBX system 2 (S8') and sending the type of network which is currently used (S9'). If WAN is not active, then it is checked whether GSM is active (S6). If it is active, the process may either end with "nothing to do" (S7'), or a connection to the PBX system 2 may be established (S8') so as to send the type of network which is currently used (S9').

What is claimed is:

1. A computer-implemented method for establishing a voice over internet protocol (VOIP) communication between a private branch exchange (PBX) system and a first terminal device in a communication network, wherein the first terminal device is provided with a VOIP application or video call application, and wherein the PBX system and the first terminal device are able to communicate via a first communication connection and a second communication connection in the communication network, the method comprising:

receiving, by the PBX system, a call from a second terminal device to be forwarded to the first terminal device;

verifying, by the PBX system, if the first terminal device is logged in the communication network, wherein when the PBX system verifies that the first terminal device is not logged in, the call is rejected, and when the PBX system verifies that the first terminal device is logged in, then the PBX system performs the steps of:

determining, whether the VOIP application or video call application on the first terminal device is running in a background mode with the VOIP application or video call application being inactive, or in a foreground mode with the VOIP application or video call application being active, and when the PBX system determines that the VOIP application or video call application is running in the foreground mode, using the first connection between the PBX system and the first terminal device for forwarding the call to the first terminal device, and, when the PBX system determines that the VOIP application or video call application is running in the background mode, using the second connection between the PBX system and the first terminal device for receiving information from the first terminal device on what type of its communication connection that it is using at that point of time.

2. The method according to claim 1, wherein the method also comprising: when the PBX system cannot determine that the VOIP application or video call application is running in the foreground mode, the PBX system transmitting a first message to a remote notification server being provided in the communication network in order to cause the remote notification server to send a remote notification message to the first terminal device.

3. The method according to claim 2, wherein the second connection between the PBX system and the first terminal device is activated, and the method also comprises the PBX system, after the first terminal device, has received the remote notification message from the remote notification server, receiving a message from the first terminal device via the second connection comprising information that the VOIP application or video call application is moved into the foreground mode.

4. The method according to claim 2, wherein the second connection between the PBX system and the first terminal device is activated, and the method also comprises the PBX system, after the first terminal device has received the remote notification message from the remote notification server, receiving a message from the first terminal device via the second connection, the message comprising information on what type of communication connection the first terminal device is using at that point of time.

5. The method according to claim 4, comprising: the PBX system, upon receiving information on the type of communication connection that the first terminal device is using at that point of time, deflecting the call to that communication connection.

6. The method according to claim 4, comprising: the PBX system deflecting the call to Voice Mail or to a third terminal device, which is also equipped with a VOIP application or video call application, upon receiving information on the type of communication connection that the first terminal device is using at that point of time.

7. The method according to claim 2, comprising: after the remote notification server has sent a remote notification message to the first terminal device, starting a time window that expires either upon receipt of information on the type of connection by the PBX system or upon reaching a predetermined upper time limit.

8. The method according to claim 1, wherein the type of communication connection comprises at least one of local area network (LAN), wide area network (WAN), and global system for mobile communications (GSM).

9. The method according to claim 1, wherein the first connection between the PBX system and the first terminal device are activated, and when the VOIP application or video call application is in the foreground mode, the method further comprising terminating the call by the VOIP application, when the VOIP application or video call application moves to the background mode.

10. The method according to claim 1, wherein the first connection is based on Hypertext Transfer Protocol (HTTP), Socket or Web Socket Protocol.

11. The method according to claim 1, wherein the second connection is based on Hypertext Transfer Protocol (HTTP), Socket or Web Socket Protocol.

12. An improved private branch exchange (PBX) system of the type capable of communicating with a first terminal device, the first terminal device being equipped with a voice over internet protocol (VOIP) application or video call application for forwarding a VOIP call or video call from a second terminal device to which the system is being adapted to connect, and to a remote notification server, wherein the improvement comprises a core unit which is adapted for communicating with the VOIP application of the first terminal device via a first connection, and a provider unit, which is adapted to send a remote notification to the VOIP application or video call application of the first terminal device via the remote notification server when the PBX system determines that the VOIP application or video call application is running in a background mode or the PBX system is unable to determine that the VOIP application or video call application is running in a foreground mode so that a second connection between the PBX system and the first terminal device is utilized for receiving information from the first terminal device on what type of communication connection the first terminal device is using at that point of time for use in directing the call from the second terminal device, wherein the core unit is adapted to communicate with the first terminal device via the first connection, when the VOIP application or video call application on the first terminal device is running in the foreground mode, and communicate via the second connection for receiving the information from the first terminal device on what type of communication connection the first terminal device is currently using when the VOIP application or video call application is operating in the background mode.

13. The improved PBX system according to claim 12, wherein the first connection is based on Hypertext Transfer Protocol (HTTP), Socket or WebSocket, and wherein the second connection is also based on Hypertext Transfer Protocol (HTTP), Socket or Web Socket Protocol.

14. A communication network comprising:
 a private branch exchange (PBX) system of the type capable of communicating with a first terminal device equipped with a VOIP application or video call application for forwarding a VOIP call or video call from a second terminal device to which the PBX system is communicatively connectable;
 a remote notification server to which the PBX system is communicatively connectable;
 the PBX system comprising a core unit which is adapted for communicating with the VOIP application of the first terminal device, and a provider unit, which is adapted to send a remote notification to the VOIP application or video call application of the first terminal device via the remote notification server when the PBX system determines that the VOIP application or video call application of the first terminal device is running in a background mode or the PBX system is unable to determine that the VOIP application or video call application of the first terminal device is running in a foreground mode, wherein the core unit is adapted to communicate with the first terminal device via a first connection when the VOIP application or video call application on the first terminal device is running in the foreground mode, and communicate with the first terminal device via a second connection for receiving information from the first terminal device on what type of communication connection the first terminal device is currently using that is responsive to the remote notification.

15. The network of claim 14, wherein the remote notification server is configured to send the remote notification to the first terminal device in response to a message from the provider unit to prompt the first terminal device to send a message to the PBX system via the second connection to identify the type of communication connection the first terminal device is currently using when the VOIP application is running in the background mode on the first terminal device or the PBX system is unable to determine whether the VOIP application is running in the foreground mode.

16. The network of claim 15, wherein the first connection is based on Hypertext Transfer Protocol (HTTP), Socket protocol or Web Socket Protocol.

17. The network of claim 15, wherein the second connection is based on Hypertext Transfer Protocol (HTTP), Socket protocol or Web Socket Protocol.

18. The network of claim 14, wherein, the PBX system is configured to start a time window after sending of the remote notification is initiated, the time window set to expire either upon receipt of information on the type of connection from the first terminal device by the PBX system or upon reaching a predetermined upper time limit.

19. The network of claim 18, wherein the PBX system is configured to deflect the call to Voice Mail or to a third terminal device that is equipped with a VOIP application or video call application when the predetermined upper time limit is reached and the PBX system has not yet received the information from the first terminal device on what type of communication connection the first terminal device is currently using.

20. The network of claim 18, wherein the PBX system is configured to direct the call to the first terminal device in response to receiving the information from the first terminal device on what type of communication connection the first terminal device is currently using before the predetermined upper time limit is reached.

\* \* \* \* \*